United States Patent [19]

Gilleland

[11] Patent Number: 5,092,367
[45] Date of Patent: Mar. 3, 1992

[54] ASYMMETRICAL SKID ASSEMBLY

[75] Inventor: Frank W. Gilleland, Orlando, Fla.

[73] Assignee: Cues, Inc., Orlando, Fla.

[21] Appl. No.: 595,823

[22] Filed: Jan. 9, 1990

[51] Int. Cl.$^5$ ............................................. F16L 55/16
[52] U.S. Cl. ........................................ 138/98; 138/90; 138/103; 138/108; 138/109; 138/178
[58] Field of Search ..................... 138/90, 97, 98, 103, 138/108, 111, 112, 113, 109, 178

[56] References Cited

U.S. PATENT DOCUMENTS

| | | | |
|---|---|---|---|
| 2,807,937 | 10/1957 | Rhodes | 138/93 |
| 3,103,235 | 9/1963 | Stringham | 138/93 |
| 3,618,639 | 11/1971 | Daley et al. | 138/93 |
| 3,817,086 | 6/1974 | Dorgebray et al. | 138/90 |
| 3,834,421 | 9/1974 | Daley | 138/93 |
| 3,884,261 | 5/1975 | Clynch | 138/93 |
| 3,946,761 | 3/1976 | Thompson et al. | 138/93 |
| 4,280,535 | 7/1981 | Willis | 138/112 |
| 4,442,867 | 4/1984 | de Sivry et al. | 138/93 |
| 4,444,995 | 4/1984 | Fischer | 138/108 |
| 4,484,602 | 11/1984 | Guthrie | 138/93 |
| 4,595,047 | 6/1986 | Estienne | 138/108 |
| 4,616,258 | 10/1986 | Ono et al. | 138/90 |
| 4,637,588 | 1/1987 | Wilhelm et al. | 138/93 |

Primary Examiner—James E. Bryant, III
Attorney, Agent, or Firm—Epstein, Edell & Retzer

[57] ABSTRACT

A skid assembly for supporting a packer or the like in a pipeline includes three skid blades of different configuration whereby the radial apex of each blade is longitudinally offset from the radial apex of the other blades. With this configuration the skid assembly is capable of being transported past a radial offset or other radially reduced portion of the pipeline as each apex passes the offset independently of the other apices.

16 Claims, 1 Drawing Sheet

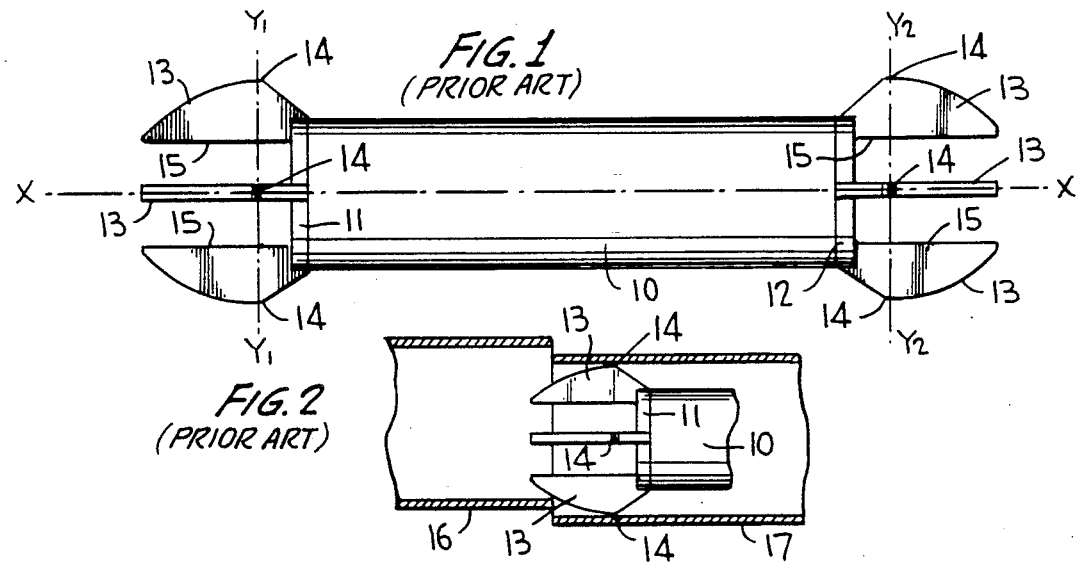
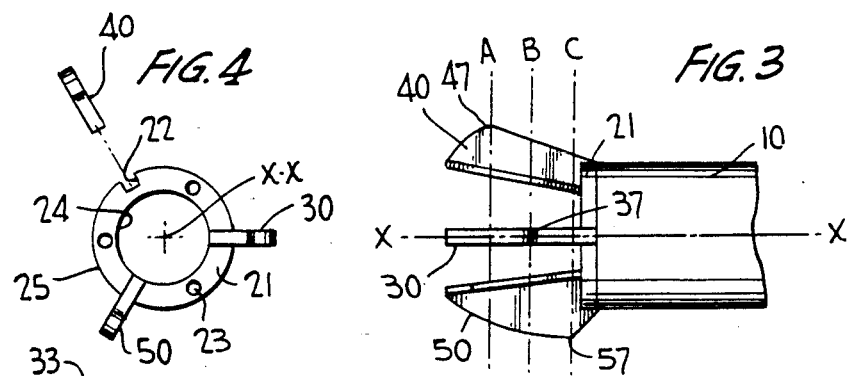
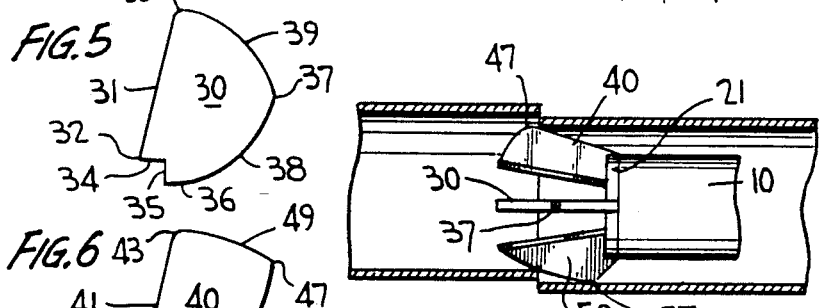
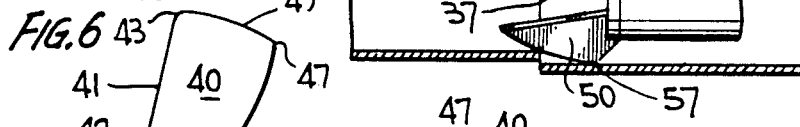
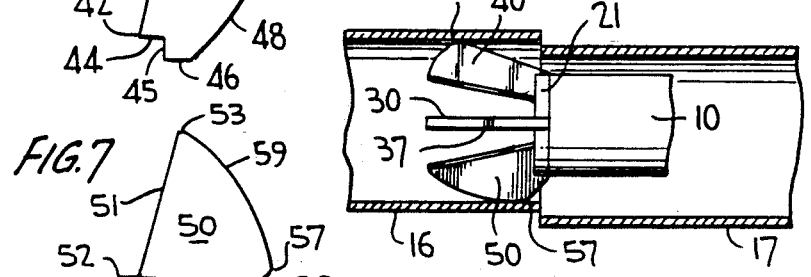

ASYMMETRICAL SKID ASSEMBLY

BACKGROUND OF THE INVENTION

1. Technical Field

The present invention relates to improvements in skid assemblies employed to permit inspection and maintenance equipment to slide freely when pulled or otherwise driven through pipelines. Although the preferred embodiment of the present invention is described in connection with a packer apparatus used for detecting and sealing leaks in sewer lines, it is to be understood that the present invention has broader applicability and may be employed with a wide variety of equipment utilized in various types of pipelines.

2. Discussion of the Prior Art

Packer assemblies are commonly employed to detect and/or seal leaks in sewer lines. Such assemblies are generally cylindrical with a diameter smaller than the internal diameter of the pipe in which the assembly is to be used. A pair of axially spaced sleeves are inflatable on the packer assembly to seal off a section of a pipe therebetween so that pressurized liquid can be delivered to the sealed space. Such packers are typically provided with skid assemblies at their opposite ends to facilitate smooth movement of the packer to the desired location within the pipe. Each skid assembly typically includes four skid blades spaced equiangularly about the central longitudinal axis of the packer and extending radially beyond the packer periphery so that only the edge of the skid blade, and not the packer itself, rests upon and contacts the internal pipe surface. The angular spacing assures that at least two of the skid blades of each assembly ride along the internal pipe surface as the packer is transported through the pipe.

A typical prior art packer assembly of the type described above is illustrated in FIG. 1 to which specific reference is now made. The packer assembly includes a generally cylindrical body 10 having annular end plates 11 and 12. Such packers are well known, and typical examples are found in U.S. Pat. Nos. 3,618,639, 3,103,235 and 3,834,421. Secured to each end plate 11, 12 are four substantially identical skid blades 13, only three of which are visible for each end plate in FIG. 1. The four skid blades 13 comprising each skid assembly are spaced at equal angles of 90 degrees about the central longitudinal axis X—X of the packer body 10. The outer edge of each blade 13 extends in a straight line from the end plate 11 or 12 axially outward and radially outward from the packer to an apex 14. From apex 14 the outer edge extends convexly in directions axially away from the packer body 10 but radially inward to intersect the blade inner edge 15. The latter extends back to the end plate 11 or 12 in a 20 direction generally parallel to the axis X—X.

The four identical skid blades 13 extending from end plate 11 all have their apices 14 disposed in a common plane $Y_1$—$Y_1$ oriented perpendicular to axis X—X. Likewise, the apices 14 of the four identical skid blades extending from end plate 12 are all disposed in a common plane $Y_2$—$Y_2$ oriented perpendicular to axis X—X. This arrangement has the disadvantage of preventing the packer assembly from moving through radial offsets that may occur at the intersections of pipe sections in a pipeline. More specifically, and referring to FIG. 2 of the accompanying drawings, two adjacent pipe sections 16 and 17 are shown radially offset, a situation that might occur due to the ground settling, etc. Packer 10, with its end plate 11 and associated skid assembly, is shown approaching the offset junction between pipe sections 16 and 17. In the illustrated example, the spacing between the apices 14 of diametrically opposite skid blades is shown approximately equal to the internal diameter of the pipe section in order to emphasis the inability of the skid assembly to traverse the offset pipe junction. Specifically, the offset junction has an effective internal diameter that is smaller than the space between diametrically opposite blade apices 14 and, therefore, blocks passage of the packer into pipe section 16. Typically, the spacing between apices of diametrically opposite skid blades is somewhat less than the internal pipe diameter. For example, with a pipe section having an eight inch internal diameter, the distance between diametrically opposite skid blade apices might typically be seven and one-half inches. If the radial offset between pipe sections 16 and 17 is greater than one-half inch, the skid assembly will not fit through the offset junction because the opening at the junction will be less than the seven and one-half inch spacing between diametrically opposite skid blade apices 14. Reducing the radial dimension of the skid blade apices could mitigate the problem; however, such reduction would subject the inflatable packer sleeves to abrasive damage due to contact with the internal pipe wall and projections therefrom as the packer is transported through the pipeline.

OBJECTS AND SUMMARY OF THE INVENTION

It is an object of the present invention to provide an improved skid assembly for pipeline inspection and sealing packers, and the like, in order to permit the packer to traverse radial offsets at junctions of pipe sections. It is a further object of the present invention to accomplish this desirable result without reducing the radial extension of the skid blade apices.

In accordance with the present invention an asymmetrical skid blade assembly includes blades having different configurations such that the apex of each skid blade resides in a different respective plane oriented perpendicular to the packer longitudinal axis. Although the radial extension of each skid blade apex is the same, the axial offset of the apices presents a smaller planar front that moves through the pipe offset junction to thereby permit the skid assembly to traverse that junction. With this arrangement, each skid blade apex can be moved through the offset junction sequentially.

The present invention further enhances the ability of the packer assembly to traverse a radial offset at a pipe junction by including only three skid blades instead of the four blades commonly employed in the prior art. With only three equiangularly spaced skid blades in the assembly, initial contact with a pipe edge at an offset junction is made by the outer edge of a single skid blade, resulting in a tendency of the packer to pivot relative to the contact point. The result is a rotation of the packer within the pipeline such that the angular orientation of the skid blades can be made more favorable for the assembly to pass through the pipe offset.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings, wherein like reference numerals in the various figures are utilized to designate like components, and wherein:

FIG. 1 is a side view in elevation of a prior art packer and its skid assembly;

FIG. 2 is a diagrammatical illustration showing how the prior art packer of FIG. 1 is unable to traverse an offset junction between two sections of a pipeline;

FIG. 3 is a broken detailed view in elevation of a portion of a packer assembly having the improved skid assembly of the present invention affixed thereto;

FIG. 4 is an end view in elevation, partially exploded, of the skid assembly of FIG. 3;

FIG. 5 is a side view in plan of one of the skid blades of the skid assembly of FIG. 3;

FIG. 6 is a side view in plan of a second of the skid blades of the skid assembly of FIG. 3;

FIG. 7 is a side view in plan of the third of the skid blades in the skid assembly of FIG. 3;

FIG. 8 is a diagrammatic illustration of the assembly of FIG. 3 shown approaching an offset junction in a pipeline; and FIG. 9 is a view similar to FIG. 8 but showing the skid assembly having traversed the offset junction in the pipeline.

DESCRIPTION OF THE PREFERRED EMBODIMENTS

Referring to FIGS. 3 through 7 of the accompanying drawings, a packer assembly includes a body 10 having a pair of annular end plates 21 made from suitable plastic or metal material. Only one end plate 21 is illustrated in the broken view of FIG. 3, it being understood that the opposite end plate is substantially identical and has associated therewith a skid assembly of the type described below. An inner edge 24 of the end plate faces radially inward; an outer edge 25 faces radially outward. End plate 21 has three notches 22 defined radially inward from peripheral edge 25 for receiving appropriately configured portions of skid blades described below. Notches 22 extend radially through approximately half the radial length of plate 21 and are successively spaced at equal angles about the central longitudinal axis X—X of the packer assembly and the end plate. In the illustrated embodiment, notches 22 have a generally rectangular configuration. End plate 21 is secured to the packer by means of screws, or the like, extending through suitably provided holes 23 defined axially through the end plate.

Three skid blades 30, 40 and 50 are secured to end plate 21 at respective notches 22. Unlike prior art skid assemblies, the skid blades 30, 40 and 50 are all shaped differently. In particular, the different skid blade shapes are selected such that the distance between the radial extremity of each blade and the packer longitudinal axis X—X is approximately the same; however, the location of that extremity along axis X—X differs for each blade. Skid blade configurations for accomplishing this requirement are virtually infinite and, accordingly, there are virtually infinite configurations that fall within the scope of the present invention. A preferred embodiment for the skid blade configurations is illustrated herein and described below and is intended only as an example.

Considering blade 30 illustrated in FIG. 5, the blade has a straight inner edge 31 having a proximal end 32 and a distal end 33. When blade 30 is secured to end plate 21, as by welding, adhesive, etc., proximal end 32 is disposed at a circular edge defining the junction of the outwardly facing annular surface of end plate 21 with the radially inner edge 24. In this regard the proximal end of blade 30 is cut away to provide a short edge 34 extending radially outward from end 32 for a distance corresponding to the radial width along plate 21 from inner edge 24 to the base of notch 22. The inner end of edge 34 joins a short axially extending edge 35 terminating at its outward end at a straight base portion 36 of the blade edge. The length of edge 35 corresponds to the thickness of plate 21 so that edge 35 resides entirely within notch 22. The straight base portion 36 of the blade edge extends perpendicularly from edge 35 for a distance corresponding to the radial depth of notch 22 so that it terminates at the outer circular edge 25 of plate 21. It will be appreciated, therefore, that the combined radial length of edge 34 and base edge portion 36 corresponds to the radial dimension of annular plate 21. Further, as best illustrated in FIG. 4, the thickness of each blade 30, 40 and 50 substantially corresponds to the width of slots 22 so that a rectangular portion of blade 30, partially defined by edge 35 and base edge portion 36, is snugly received in a respective slot 22, hile edge 34 extends radially therefrom along the outer annular surface of plate 21.

The outer edge of the skid blade 30 is subdivided into two segments 38 and 39 by an apex 37 constituting he radially outermost point on the blade. Segment 38 extends between apex 37 and the end of base edge portion 36 remote from edge 35. Segment 39 extends between apex 37 and distal end 33 of inner edge 31. Segments 38 and 39 may be straight, concave, convex (as illustrated in the preferred embodiment) or otherwise configured, but must not extend radially outward beyond apex 37. The apex may be a linear edge, a rounded edge, or a flattened edge, whatever is suitable for the particular application, bearing in mind that the apex constitutes the point of the blade that contacts the interior pipe surface when the assembly is pulled or otherwise driven through a pipeline. Most important, however, is the axially offset location of apex 37 along axis X—X relative to the locations of the apices of blades 40 and 50, as described below.

Skid blade 40, illustrated in FIG. 6 is substantially identical to blade 30 in all respects except as to its outer edge. Thus, blade 40 includes a straight inner edge 41 having a proximal end 42 and distal end 43, a short radially extending edge 44, a short axially extending edge 45, and a straight base edge portion 46, all substantially identical in size and shape to respective elements 31 through 36 of blade 30. The outer edge, however, has its apex 47 spaced axially further from edge 44 (and, therefore, from end plate 21) than the spacing between apex 37 and edge 34 in blade 30. Outer edge segment 48 is convex but significantly longer than segment 38. Convex segment 49, on the other hand, is shorter than segment 39.

Referring to FIG. 7, blade 50 includes a straight inner edge 51 with a proximal end 52 and a distal end 53, a short radially extending edge 54, a short axially extending edge 55 and a straight base edge portion 56, all substantially identical in size and shape to respective elements 31 through 36 of blade 30 and respective elements 41 through 46 of blade 40. Apex 57 of the outer edge, however, is disposed axially closer to edge 54 and to plate 21 than the spacing between apex 37 and edge 34 (and plate 21) and the spacing between apex 47 and edge 44 (and plate 21). Accordingly, convex edge segment 58 is significantly shorter than either of segments 38 or 48, and convex edge segment 59 is significantly longer than either of segments 39 or 49.

With the blade configurations as described above, and as best illustrated in FIG. 3, the apices 37, 47 and 57 have different respective axial spacings from end plate 21. Otherwise stated, apices 47, 37 and 57 are disposed in three different respective planes A, B and C oriented perpendicular to longitudinal axis X—X of the packer. The radial spacing of each apex from axis X—X is substantially the same as for the others. As a consequence, if the packer assembly encounters the junction of radially offset pipe sections 16 and 17, as shown in FIG. 8, while being translated axially through a pipeline, each of the apices traverses the junction at a different point in time. The skid assembly is thus able to be passed through an offset junction, as illustrated in FIG. 9, having a dimension smaller than twice the radial distance from axis X—X to any one of the apices. In the prior art skid assembly illustrated in FIG. 2, the coplanar apices preclude such passage.

In addition to the apical offset feature described above, the present invention employs only three skid blades to advantage. Specifically, when the leading skid blade reaches an offset junction, it tends to ride inward along the junction on its remote outer edge segment 39, 49 or 59. When the packer is supported in such a position, it tends to rotate about the point of contact between the blade edge and the pipe junction. It is possible, therefore, to move the packer assembly axially back and forth a number of times until the assembly is rotated to a more favorable position relative to passage through the junction.

It must be pointed out that the axial length of all three blades (i.e., the distance between the base edge portion 36 and distal end 33, for example) is the same in the illustrated embodiment. This is a desirable but not necessary feature of the present invention. Likewise, the attachment of the blades to a notched end plate, rather than directly to the packer or to some otherwise configured end plate, is desirable but not a necessary feature of the invention.

The axial displacement between apices 37, 47 and 57 will depend upon the particular system application, including the dimensions of the pipeline, the extent of the expected offsets to be encountered, and, to some extent, the size and shape of the packer assembly or other apparatus being transported on the skid assemblies. In a particularly useful skid assembly constructed in accordance with the present invention, the axial displacement between apex 37 and apex 47 (i.e., between planes A and B) was made substantially the same as the axial displacement between apices 37 and 57 (i.e., between planes B and C).

From the foregoing it will be appreciated that the present invention makes available a unique skid assembly for riding on the interior surface of a pipeline to permit a skid-supported apparatus to be axially transported through the pipeline without being impeded by radial offset junctions between successive pipe sections.

Having described a preferred embodiment of a new and improved skid assembly constructed in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A skid assembly for supporting a device in spaced relation from the interior surface of a pipeline while the device is disposed in a pipeline and transported therein along a longitudinal axis of the device, said skid assembly comprising a plurality of skid blades of different configuration such that each slid blade has a respective radial extremity disposed longitudinally offset from the radial extremities of the other skid blades;
   wherein said skid assembly is a first skid assembly disposed at one longitudinal end of said device, said apparatus further comprising a second skid assembly configured substantially identical to said first skid assembly and disposed at a second longitudinal end of said device;
   wherein said device is a packer assembly for detecting and sealing leaks in said pipeline.

2. The apparatus according to claim 1 wherein said plurality of skid blades comprises three skid blades.

3. The apparatus according to claim 1 wherein said plurality of skid blades consists of three skid blades, and wherein said three skid blades are positioned about said longitudinal axis at locations spaced by 120 degrees.

4. The apparatus according to claim 1 wherein said packer has a central longitudinal axis, and wherein the radial spacing from said longitudinal axis to the radial extremities of all of said blades is the same.

5. Apparatus including a first skid assembly for supporting a device in spaced relation to the interior surface of a pipeline while the device is disposed in and transported along a longitudinal dimension within the pipeline, said device having first and second ends spaced along its longitudinal axis oriented generally parallel to said longitudinal dimension when said device is in said pipeline, said device further having a transverse extremity disposed a predetermined distance from said longitudinal axis, said first skid assembly comprising:
   first, second and third skid blades secured to and extending longitudinally beyond said first end of said device;
   wherein each of said first, second and third skid blades has an outer edge facing away form said longitudinal axis and extending longitudinally from and beyond said first end of said device, said outer edge having a radial extremity or apex displaced radially from said longitudinal axis by a radial distance greater than said predetermined distance; and
   wherein the spacing along said longitudinal axis between the first end of said device and the outer edge apices of each of said first, second and third skid blades is different.

6. The apparatus according to claim 5 wherein the radial spacing from said longitudinal axis of the apices of the outer edges of all of said skid blades is the same.

7. The apparatus of claim 6 wherein said skid blades are disposed in respective planes intersecting at said longitudinal axis and disposed equiangularly about that axis.

8. The apparatus according to claim 6 wherein said first, second and third skid blades are the only skid blades in said first skid blade assembly and are disposed substantially equiangularly about said longitudinal axis.

9. The apparatus according to claim 6 wherein said skid blades all have a common length along said longitudinal axis.

10. The apparatus according to claim 6 wherein said skid blades all have different planar configurations.

11. The apparatus according to claim 6 further comprising a second skid assembly substantially identical to said first skid assembly but secured to and extending longitudinally beyond said second end of said device.

12. The apparatus according to claim 11 wherein said device is a packer assembly for detecting and sealing leaks in said pipeline.

13. The apparatus according to claim 5 wherein aid first, second and third skid blades are the only skid blades in said first skid blade assembly and are disposed substantially equiangularly about said longitudinal axis.

14. The apparatus according to claim 5 wherein said skid blades all have a common length along said longitudinal axis.

15. The apparatus according to claim 5 further comprising a second skid assembly substantially identical to said first skid assembly but secured to and extending longitudinally beyond said second end of said device.

16. The apparatus according to claim 25 wherein said device is a packer assembly for detecting and sealing leaks in said pipeline.

* * * * *